(12) United States Patent
Mori

(10) Patent No.: US 12,679,421 B2
(45) Date of Patent: Jul. 14, 2026

(54) VEHICLE CONTROL DEVICE, VEHICLE CONTROL METHOD, AND STORAGE MEDIUM

(71) Applicant: TOYOTA JIDOSHA KABUSHIKI KAISHA, Toyota (JP)

(72) Inventor: Masashi Mori, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 16 days.

(21) Appl. No.: 18/528,196

(22) Filed: Dec. 4, 2023

(65) Prior Publication Data

US 2024/0239382 A1     Jul. 18, 2024

(30) Foreign Application Priority Data

Jan. 12, 2023     (JP) ................................. 2023-003353

(51) Int. Cl.
*B60W 60/00*          (2020.01)
*B60W 50/14*          (2020.01)

(52) U.S. Cl.
CPC ........ *B60W 60/0053* (2020.02); *B60W 50/14* (2013.01); *B60W 2050/146* (2013.01); *B60W 2540/223* (2020.02)

(58) Field of Classification Search
CPC ............. B60W 60/0053; B60W 50/14; B60W 2540/223; B60W 2050/146; G06V 20/597; B60Q 9/00; B60Q 9/002; G08G 1/00

USPC .......................................................... 701/23
See application file for complete search history.

(56) References Cited

U.S. PATENT DOCUMENTS

| | | | | |
|---|---|---|---|---|
| 2017/0285641 A1* | 10/2017 | Goldman-Shenhar ....................... | | |
| | | | | B60W 60/00136 |
| 2018/0222490 A1 | 8/2018 | Ishihara et al. | | |
| 2018/0345980 A1 | 12/2018 | Morita et al. | | |
| 2018/0348758 A1* | 12/2018 | Nakamura ............ | B60W 50/14 | |
| 2020/0269756 A1* | 8/2020 | Yamanaka ............ | B60Q 1/507 | |
| 2021/0080949 A1* | 3/2021 | Takeda ..................... | B62D 1/06 | |
| 2022/0063649 A1 | 3/2022 | Takabatake et al. | | |
| 2024/0051542 A1* | 2/2024 | Ando .................. | B60W 50/082 | |
| 2024/0109413 A1* | 4/2024 | Poornachandran .... | B60K 35/53 | |

FOREIGN PATENT DOCUMENTS

| | | | | |
|---|---|---|---|---|
| EP | 4049877 A1 * | 8/2022 | ............. | B60K 35/10 |
| JP | 2020-102252 A | 7/2020 | | |
| JP | 2022-041243 A | 3/2022 | | |
| WO | 2019/188587 A1 | 10/2019 | | |
| WO | 2021/106180 A1 | 6/2021 | | |

* cited by examiner

*Primary Examiner* — Tuan C To
(74) *Attorney, Agent, or Firm* — SoraIP, Inc.

(57)     ABSTRACT

The vehicle control device includes a body control unit that, when a driving operation by an occupant is required during automatic driving of the vehicle, performs control to notify the terminal device possessed by the occupant to prompt the driving operation.

12 Claims, 5 Drawing Sheets

DURING AUTOMATIC DRIVING

DURING MANUAL DRIVING

VEHICLE CONTROL DEVICE, VEHICLE CONTROL METHOD, AND STORAGE MEDIUM

CROSS-REFERENCE TO RELATED APPLICATION

This application claims priority to Japanese Patent Application No. 2023-003353 filed on Jan. 12, 2023 incorporated herein by reference in its entirety.

BACKGROUND

1. Technical Field

The present disclosure relates to a vehicle control device, a vehicle control method, and a storage medium.

2. Description of Related Art

For example, Japanese Unexamined Patent Application Publication No. 2022-041243 (JP 2022-041243 A) describes a vehicle display control device capable of highlighting a guidance image in a scene where a need for a hands-on requirement is high, and reducing the troublesomeness of the guidance image in a scene where a hands-on requirement is low. The vehicle display control device includes a display control unit that, when the occupant needs to grip the steering wheel, causes a display unit provided in the vehicle cabin to display a guidance image requesting the occupant to grip the steering wheel. When the automatic driving control unit requests the occupant to grip the steering wheel before the automatic driving control unit switches from the automatic driving to the manual driving while the automatic driving of the vehicle is being continued, the display control unit causes the display unit to display the guidance image that is highlighted as compared with a case where a request is made to the occupant to continue the gripping of the steering wheel.

SUMMARY

According to the technology described in JP 2022-041243 A, when shifting from automatic driving to manual driving, a guidance image is highlighted on a display device (meter display, center display, or the like) provided in a vehicle.

On the other hand, when the automatic driving of the vehicle is performed, the automatic driving may be performed in a posture in which the occupant can relax. At this time, it is assumed that the occupant uses a terminal device such as a smartphone instead of a display device or an input device (such as a steering wheel switch). However, when the shift from the automatic driving to the manual driving is required, it is difficult to smoothly shift the driving operation when the occupant uses the terminal device.

The present disclosure is made in view of the above fact, and an object of the present disclosure is to provide a vehicle control device, a vehicle control method, and a vehicle control program capable of smoothly shifting a driving operation even when an occupant uses a terminal device in the case where the shift from automatic driving to manual driving is required.

In order to achieve the above object, a vehicle control device according to a first aspect includes a control unit that, when a driving operation by an occupant is required during automatic driving of a vehicle, performs control to notify a terminal device possessed by the occupant to prompt a driving operation.

According to the first aspect of the present disclosure, when the driving operation by the occupant is required during the automatic driving of the vehicle, the control unit performs control to notify the terminal device possessed by the occupant to prompt the driving operation. Thus, the driving operation can be smoothly shifted even when the occupant is using the terminal device in the case where the shift from automatic driving to manual driving is required.

In the vehicle control device according to the first aspect, the control unit of the vehicle control device according to the first aspect performs control to change a position of at least one of a seat and a steering wheel to a position in which the occupant is able to perform the driving operation when the occupant accepts performing the driving operation.

According to the first aspect of the present disclosure, when the occupant accepts performing the driving operation, the control unit performs control to change the position of at least one of the seat and the steering wheel to a position in which the occupant can perform the driving operation. Accordingly, the position of at least one of the seat and the steering wheel can be automatically returned to the position in which manual driving is possible.

In the vehicle control device according to the first aspect, the terminal device of the vehicle control device according to the first aspect is a smartphone of the occupant, a tablet terminal of the occupant, or an operation terminal mounted on the vehicle and detachable from the vehicle.

According to the first aspect of the present disclosure, the terminal device is a smartphone of the occupant, a tablet terminal of the occupant, or an operation terminal mounted on the vehicle and detachable from the vehicle. Thus, even when the occupant uses the smartphone, the tablet terminal, or the operation terminal, it is possible to grasp the shift to the manual driving.

Further, in order to achieve the above object, a vehicle control method according to a second aspect includes performing, by a vehicle control device, when a driving operation by an occupant is required during automatic driving of a vehicle, control to notify a terminal device possessed by the occupant to prompt the driving operation.

According to the second aspect of the present disclosure, when the driving operation by the occupant is required during the automatic driving of the vehicle, the vehicle control device performs control to notify the terminal device possessed by the occupant to prompt the driving operation. As a result, in the same manner as in the first aspect, the driving operation can be smoothly shifted even when the occupant is using the terminal device in the case where the shift from the automatic driving to the manual driving is required.

Further, in order to achieve the above object, a storage medium according to a third aspect stores a vehicle control program that causes a computer to execute, when a driving operation by an occupant is required during automatic driving of a vehicle, control to notify a terminal device possessed by the occupant to prompt the driving operation.

According to the third aspect of the present disclosure, the computer performs, when the driving operation by the occupant is required during automatic driving of the vehicle, control to notify the terminal device possessed by the occupant to prompt the driving operation. As a result, in the same manner as in the first aspect, the driving operation can be smoothly shifted even when the occupant is using the terminal device in the case where the shift from the automatic driving to the manual driving is required.

As described above, according to the present disclosure, an effect that a driving operation can be smoothly shifted even when an occupant uses a terminal device in the case where the shift from automatic driving to manual driving is required is obtained.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Exemplary embodiments of the present disclosure will be described in detail below with reference to the drawings.

Figure 1:
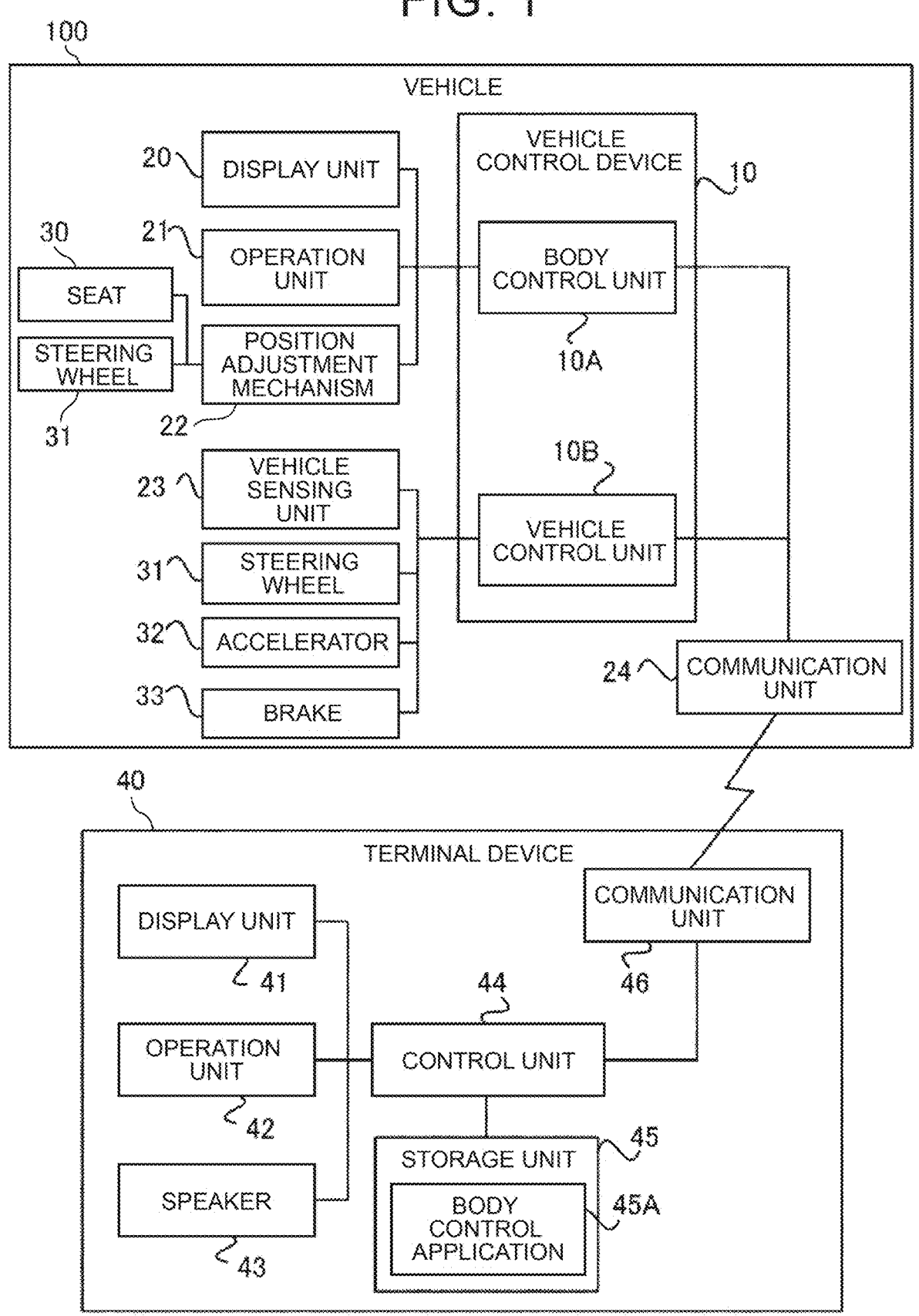
FIG. 1 is a block diagram illustrating an example of a functional configuration of a vehicle and a terminal device according to an embodiment.

FIG. 1 is a block diagram illustrating an example of a functional configuration of a vehicle 100 and a terminal device 40 according to the present embodiment.

As illustrated in FIG. 1, a vehicle 100 according to the present embodiment includes a vehicle control device 10, a display unit 20, an operation unit 21, a position adjustment mechanism 22, a vehicle sensing unit 23, a communication unit 24, a seat 30, a steering wheel 31, an accelerator 32, and a brake 33. The vehicle 100 corresponds to a level 3 or higher of autonomous driving, and is a vehicle capable of autonomous driving under certain conditions such as an expressway.

The vehicle control device 10 includes a body control unit 10A and a vehicle control unit 10B. In the present embodiment, the body control unit 10A and the vehicle control unit 10B are shown as separate control units, but the body control unit 10A and the vehicle control unit 10B may be configured as one control unit.

The body control unit 10A is a control unit for controlling each unit of the multimedia and the body, is connected to the display unit 20, the operation unit 21, and the position adjustment mechanism 22, and controls operations of each of the display unit 20, the operation unit 21, and the position adjustment mechanism 22. The body control unit 10A is connected to the communication unit 24 and enables communication with the terminal device 40 via the communication unit 24. The communication unit 24 is, for example, a communication interface for performing in-vehicle radio communication such as WiFi (registered trademark) or Bluetooth (registered trademark).

The display unit 20 is a variety of display units such as a meter display, a multimedia display, and a Head Up Display (HUD), which are mounted on the vehicle 100.

The operation unit 21 is a variety of operation units, such as a steering wheel switch and a multimedia touch panel, mounted on the vehicle 100.

The position adjustment mechanism 22 is a mechanism that is connected to each of the seat 30 and the steering wheel 31 and adjusts the position of each of the seat 30 and the steering wheel 31. It is assumed that the "position" indicates the position and the posture of each of the seat 30 and the steering wheel 31.

Next, the vehicle control unit 10B is a control unit for controlling autonomous driving, and is connected to the vehicle sensing unit 23, the steering wheel 31, the accelerator 32, and the brake 33. The vehicle control unit 10B is connected to the communication unit 24 and enables communication with the terminal device 40 via the communication unit 24.

The vehicle sensing unit 23 includes various sensors for acquiring various kinds of sensing information required for automatic driving, and monitors the state of the vehicle 100 and the surroundings of the vehicle 100 by the various sensors.

The vehicle control unit 10B controls each of the rotational amount of the steering wheel 31, the depression amount of the accelerator 32 (that is, the depression amount of the accelerator pedal), and the depression amount of the brake 33 (that is, the depression amount of the brake pedal). The vehicle control unit 10B controls the steering angle of the steering wheel in accordance with the rotational amount of the steering wheel 31, controls the opening degree of the throttle valve in accordance with the depression amount of the accelerator 32, and controls the braking force of the brake system in accordance with the depression amount of the brake 33.

Note that the vehicle control device 10 may be configured by one or a plurality of Electronic Control Unit (ECU) or may be configured by a virtual ECU.

On the other hand, the terminal device 40 includes a display unit 41, an operation unit 42, a speaker 43, a control unit 44, a storage unit 45, and a communication unit 46. The storage unit 45 stores a body control application program (hereinafter, referred to as "body control application") 45A that operates in cooperation with the vehicle control device 10. The body control application 45A is an application that can remotely operate each unit of the vehicle 100 during automated driving, and has, for example, a function of adjusting the inter-vehicle distance between the vehicle and the front vehicle during automated driving. The terminal device 40 is a terminal device carried by an occupant, and may be, for example, a smartphone of the occupant or a tablet terminal of the occupant. Here, the "owned" is not limited to the case where the passenger grasps the terminal device 40, for example, the case of using by fixing the terminal device 40 to the holder attached to the dashboard of the vehicle 100, and the like, also includes a case of using without directly gripping.

Figure 2:
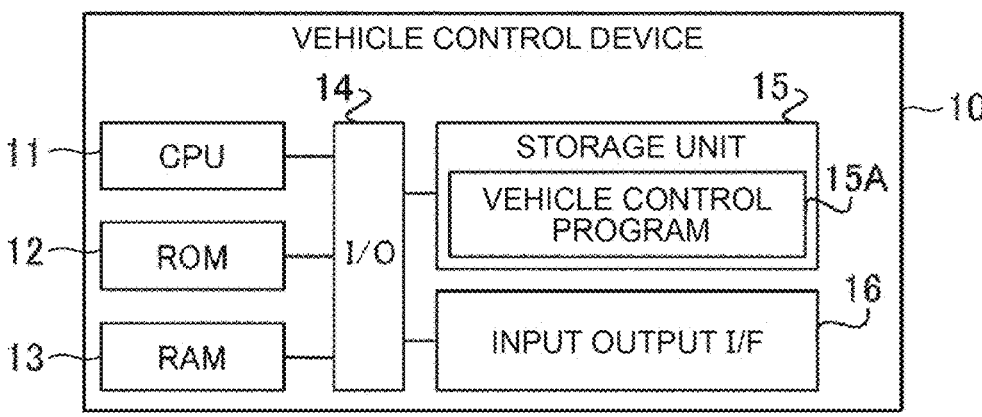
FIG. 2 is a block diagram illustrating an example of an electrical configuration of the vehicle control device according to the embodiment.

FIG. 2 is a block diagram illustrating an example of an electrical configuration of the vehicle control device 10 according to the present embodiment.

As illustrated in FIG. 2, the vehicle control device 10 according to the present embodiment includes a Central Processing Unit (CPU) 11, a Read Only Memory (ROM) 12, a Random Access Memory (RAM) 13, an input/output unit (I/O) 14, a storage unit 15, and input/output interfaces (input/output I/F) 16.

CPU 11, ROM 12, RAM 13 and I/O 14 are connected to each other via busses. Functional units including a storage unit 15 and an input/output I/F 16 are connected to I/O 14. These functional units can communicate with CPU 11 via I/O 14.

As the storage unit 15, for example, Hard Disk Drive (HDD), Solid State Drive (SSD), flash memory, or the like is used. The storage unit 15 stores the vehicle control program 15A according to the present embodiment. The vehicle control program 15A may be stored in a ROM 12.

The vehicle control program 15A may be installed in advance in the vehicle control device 10, for example. The vehicle control program 15A may be implemented by being stored in a non-volatile storage medium or distributed over a network and appropriately installed in the vehicle control device 10. The nonvolatile storage medium may be a Compact Disc Read Only Memory (CD-ROM), a magneto-optical disk, a HDD, Digital Versatile Disc Read Only Memory (DVD-ROM), a flash memory, a memory card, or the like.

The input/output I/F 16 is an interface for connecting to each of the display unit 20, the operation unit 21, the position adjustment mechanism 22, the vehicle sensing unit 23, the communication unit 24, the steering wheel 31, the accelerator 32, and the brake 33.

Incidentally, as described above, when the vehicle 100 needs to shift from automatic driving to manual driving, it is desired to smoothly shift the driving operation even when the occupant is using the terminal device 40.

Therefore, CPU 11 of the vehicle control device 10 according to the present embodiment functions as the body control unit 10A and the vehicle control unit 10B illustrated in FIG. 1 by writing and executing the vehicle control program 15A stored in ROM 12 or the storage unit 15 in RAM 13.

The body control unit 10A or the vehicle control unit 10B performs control to notify the terminal device 40 possessed by the occupant to prompt the driver operation when the driver operation by the occupant is required during the automated driving of the vehicle 100. More specifically, the display unit 41 of the terminal device 40 displays a message for prompting the driver to operate as shown in FIG. 3B as an example. Further, a voice message may be output from the speaker 43 of the terminal device 40, or a warning sound may be output from the speaker 43. Further, the terminal device 40 may be vibrated. In addition, a light emitting unit (not shown) of the terminal device 40 may be caused to emit light. Also, two or more of these displays, sounds, vibrations, and luminescence may be combined.

Here, a case where a driving operation by an occupant is required during the automatic driving of the vehicle 100 includes, for example, a case where a bad weather such as heavy rain, a case where the vehicle is out of the automatic driving section, and the like. Specifically, the "case of bad weather such as heavy rain" can be detected using, for example, a raindrop sensor (not shown) mounted on the vehicle 100. In addition, the "case where the vehicle is out of the automated driving section" can be detected using, for example, a car navigation device (not shown) mounted on the vehicle 100.

In addition, the body control unit 10A or the vehicle control unit 10B may perform control to change the position of at least one of the seat 30 and the steering wheel 31 to a position in which the occupant can perform the driving operation when the occupant receives the driving operation. During automatic driving, since the occupant is relaxed, there may be positions such as lowering the seat 30 backward and reclining (tilting) the backrest of the seat 30. In addition, there may be a position in which the steering wheel 31 is moved away from the occupant because it is not necessary to grip the steering wheel 31 during the automatic operation. On the other hand, during manual driving, since the occupant needs to grip the steering wheel 31, it is desirable that the seat 30 and the steering wheel 31 are automatically returned to the original driving position, that is, the driving-operable position. For example, it is conceivable that position data (position, posture) representing the driving position for each of the seat 30 and the steering wheel 31 is stored in the storage unit 15 in advance. When shifting from automatic driving to manual driving, the position adjustment mechanism 22 may be controlled so that the seat 30 and the steering wheel 31 are returned to the driving position represented by the position data stored in the storage unit 15. Note that the position may be changed only by the seat 30 or only by the steering wheel 31.

Next, referring to FIGS. 3A and 3B of the drawings, the screen-transition of the display unit 41 of the terminal device 40 when shifting from automated driving to manual driving will be described in detail.

Figure 3A:
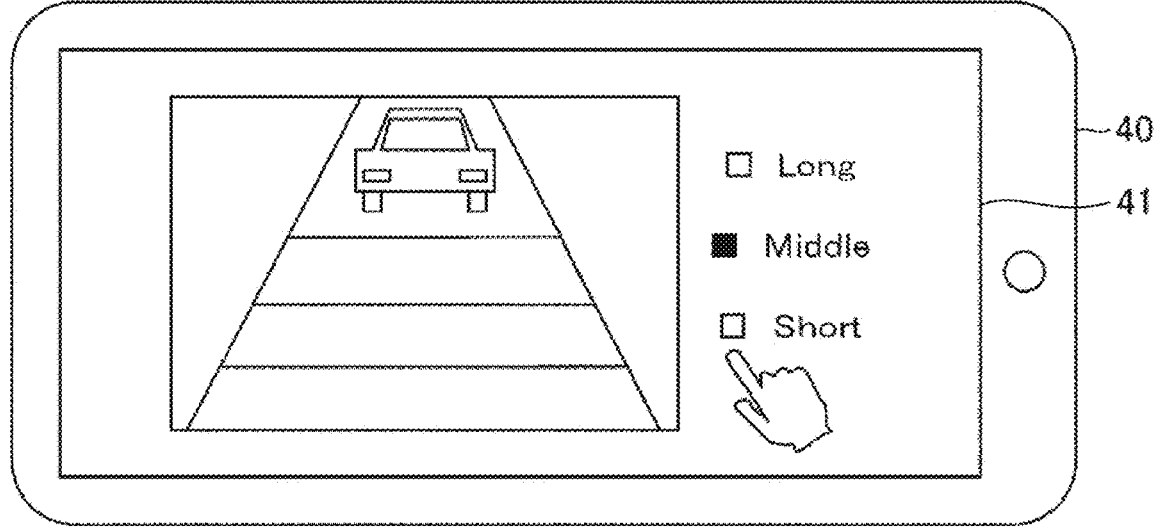
FIG. 3A is a front view illustrating an example of an application screen displayed by a body control application.
Figure 3B:
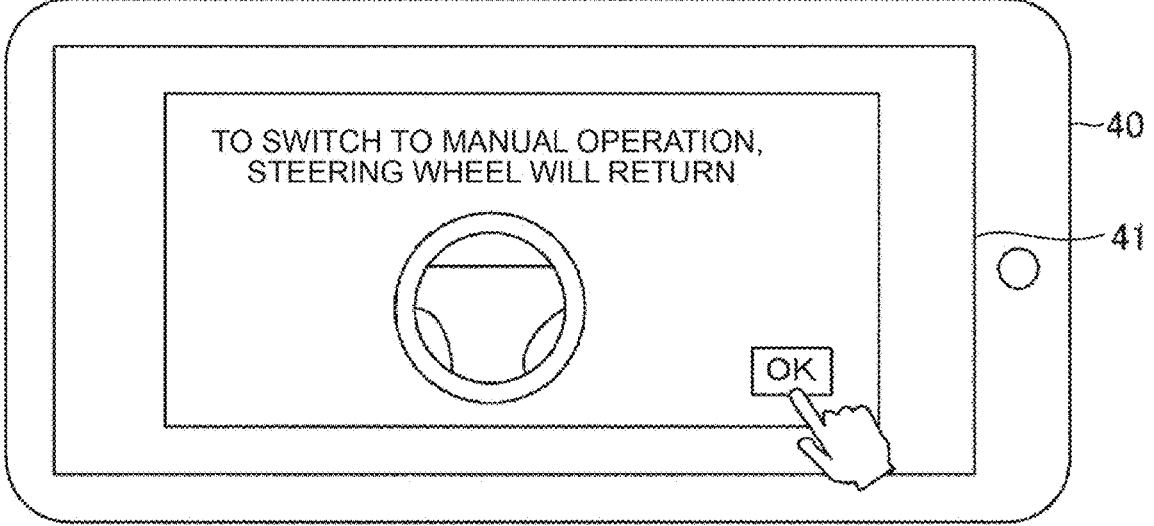
FIG. 3B is a front view illustrating an exemplary display in which a message prompting an occupant to operate the vehicle.

FIG. 3A is a front view of an application displayed by a body control application 45A. FIG. 3B is a front view showing an example of a display in which a message prompting an occupant to operate the vehicle.

As shown in FIG. 3A, during automated driving, the occupant operates the terminal device 40 (for example, a smart phone) to activate the body control application 45A, and causes the display unit 41 to display the application window. The application screen in FIG. 3A of the drawing is exemplarily shown as a screen for changing the inter-vehicle distance to the previous vehicle during automated driving. In "Middle", the inter-vehicle distance is generally defined as a distance (reference distance). In "Long", the inter-vehicle distance is longer than that in "Middle", and in "Short", the inter-vehicle distance is shorter than that in "Middle". When the occupant selects a desired inter-vehicle distance, the selected inter-vehicle distance is transmitted to the vehicle 100, and the inter-vehicle distance is controlled by the vehicle control device 10.

When shifting from autonomous driving to manual driving is required, the terminal device 40 displays a window shown in FIG. 3B in accordance with control by the body control unit 10A. In the window shown in FIG. 3B below, as an example of message that prompts the occupant to operate, "the steering wheel is returned to switch to manual operation" is displayed. However, "the steering wheel returns" means that the steering wheel returns to the original driving position. When the occupant presses the "OK" button, the body control unit 10A determines that the occupant has received the driving operation. Here, the body control unit 10A performs control to change the position of the steering wheel 31 to a position in which the occupant can operate the vehicle.

Figure 4A:
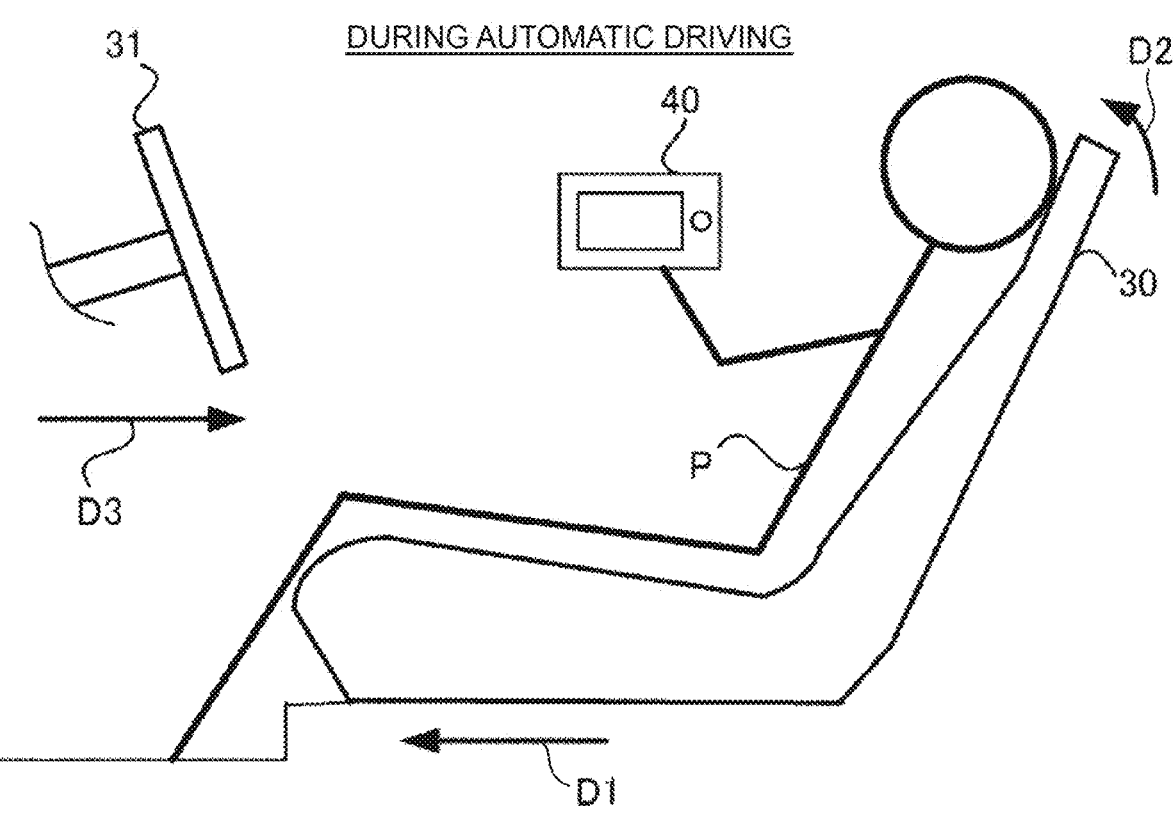
FIG. 4A is a diagram schematically illustrating an exemplary positioning of the seat and the steering wheel during autonomous operation.
Figure 4B:
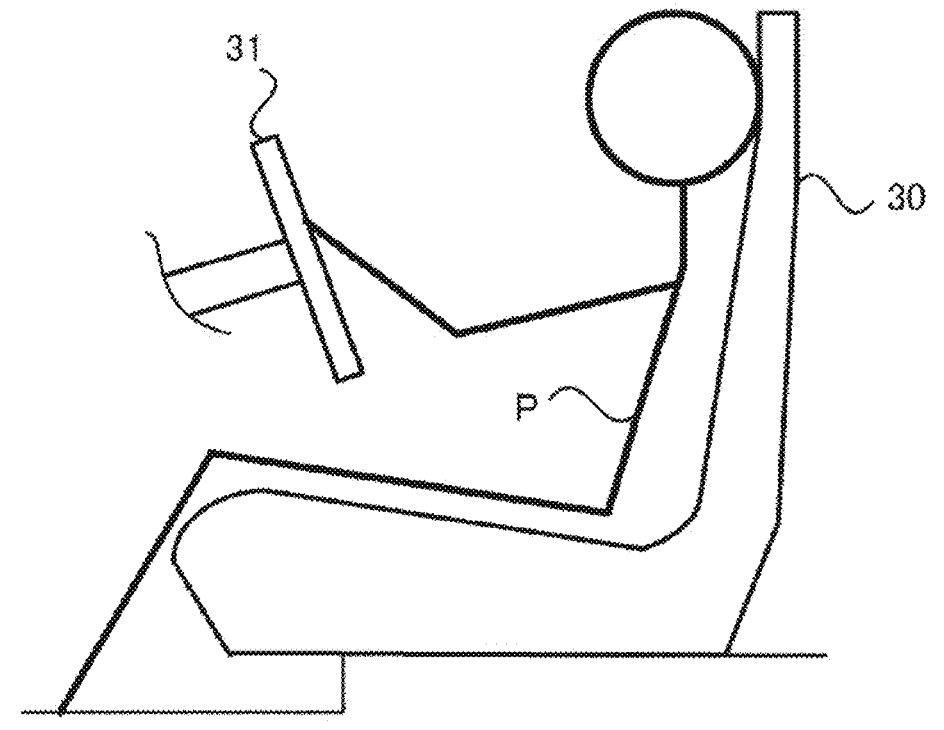
FIG. 4B is a diagram schematically illustrating an exemplary seat and steering wheel positions in manual operation.

FIG. 4A is a diagram schematically illustrating an exemplary figure of positions of a seat 30 and a steering wheel 31 during automated driving. In addition, FIG. 4B is a diagram schematically illustrating an exemplary of positions of the seat 30 and the steering wheel 31 during manual operation.

As shown in FIG. 4A, during automated driving, the occupant P possesses the terminal device 40 (for example, a smart phone). At this time, the seat 30 is moved backward, and the backrest of the seat 30 is reclined. Further, the steering wheel 31 is moved away from the occupant P. That is, the steering wheel 31 is moved forward. Note that "front" indicates a traveling direction of the vehicle 100, and "rear" indicates a reverse direction of the traveling direction. When shifting from automated driving to manual driving, in order to return the seat 30 and the steering wheel 31 to the driving position, the front-rear position of the seat 30 is moved toward the direction D1 (front), the backrest of the seat 30 is moved in the direction D2, and the front-rear position of the steering wheel 31 is moved toward the direction D3 (rear). Consequently, as shown in FIG. 4B, during manual operation, the seat 30 and the steering wheel 31 can be returned to the operating positions. During manual driving, as shown in FIG. 4B, the occupant keeps the driving attitude, grasps the steering wheel 31, and operates the contents in the meter panel with a steering wheel switch. For example, the distance between the vehicle and the front vehicle can be adjusted during Adoptive Cruise Control (ACC).

Figure 5:
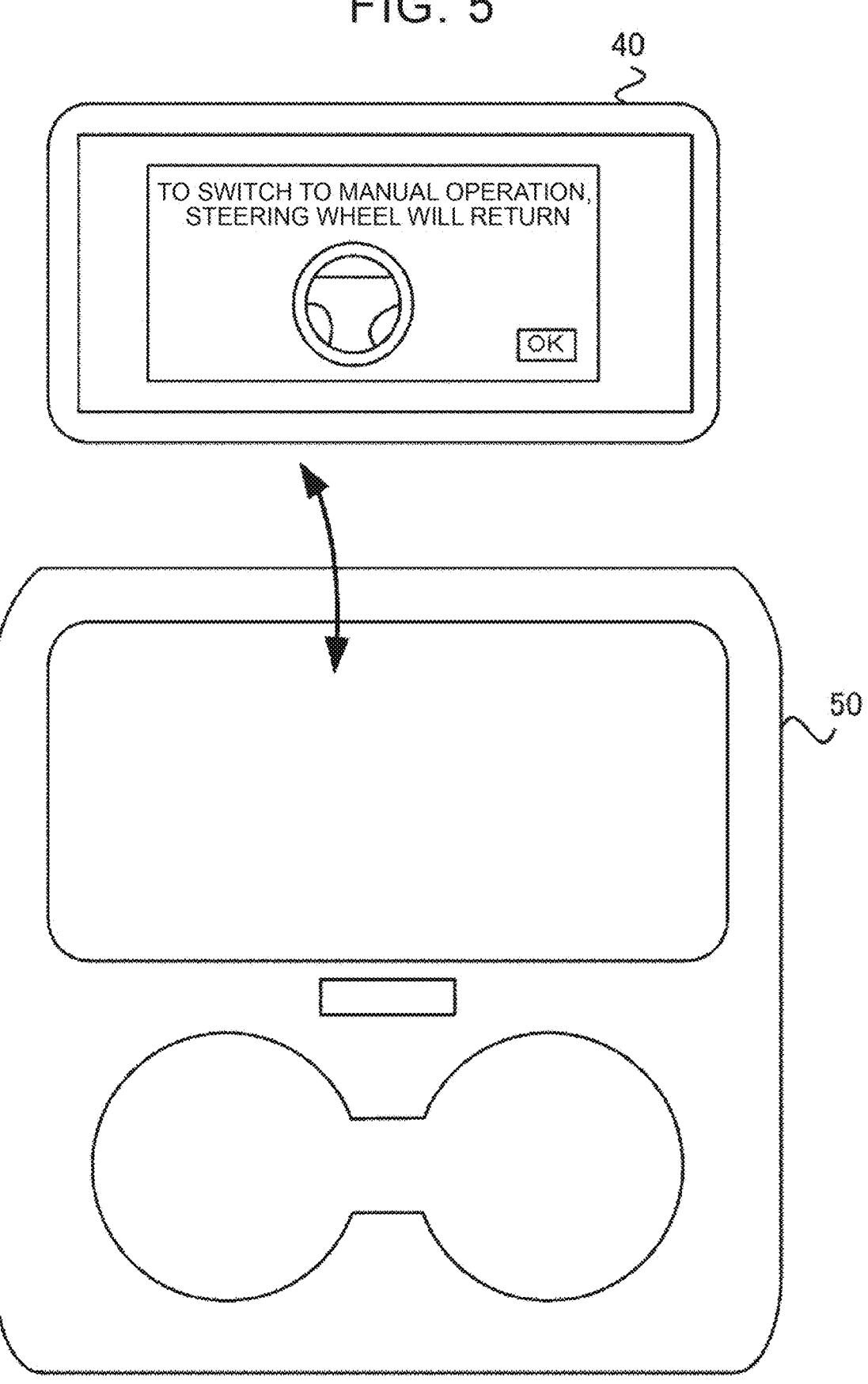
FIG. 5 is a diagram illustrating another exemplary terminal device according to the embodiment.

FIG. 5 is a diagram illustrating another example of the terminal device 40 according to the present embodiment.

The terminal device 40 illustrated in FIG. 5 is an operation terminal mounted on the vehicle 100 and detachable from the vehicle 100. The storage member 50 is a member for detachably storing the terminal device 40. The storage member 50 is integrally fixed to a predetermined location of the vehicle 100 with the vehicle 100. The terminal device 40 can be carried by an occupant, and includes, for example, a vehicle operation function, a network connection function, and the like. The occupant may use the operation terminal illustrated in FIG. 5 without using a smartphone or a tablet terminal.

Next, the operation of the vehicle control device 10 according to the present embodiment will be described with reference to FIG. 6.

Figure 6:
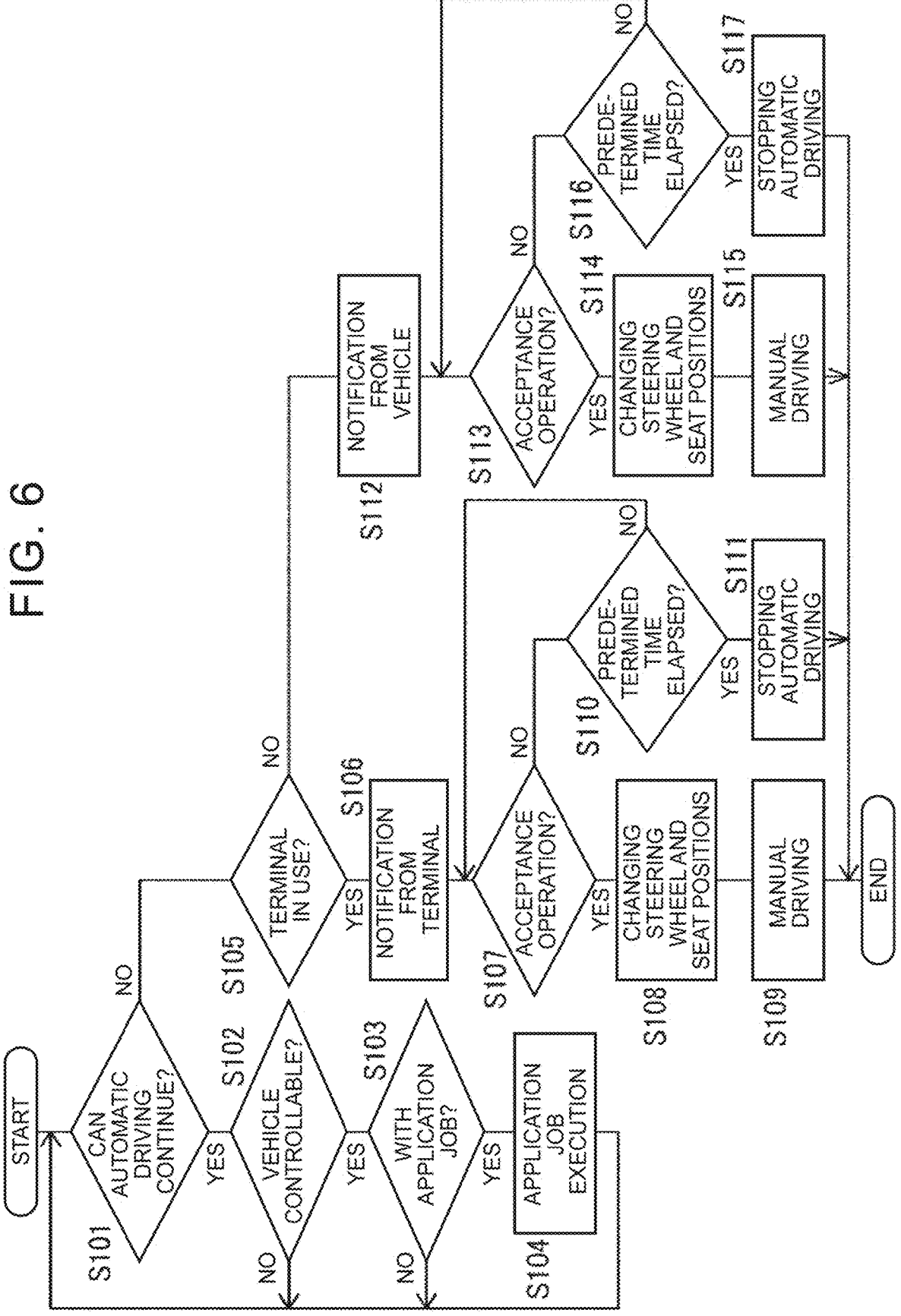
FIG. 6 is a flowchart illustrating an example of a flow of processing performed by the vehicle control program according to the embodiment.

FIG. 6 is a flow chart illustrating an exemplary flow of a process performed by the vehicle control program 15A according to the present embodiment.

First, when the vehicle control device 10 is instructed to execute the manual driving transition process, the vehicle control program 15A is activated by CPU 11, and the following processes are executed.

In S101 of FIG. 6, CPU 11 determines whether the automated driving of the vehicle 100 can be continued. When it is determined that the automatic operation can be continued (affirmative determination), the process proceeds to S102, and when it is determined that the automatic operation cannot be continued (negative determination), the process proceeds to S105. As described above, for example, in the case of bad weather such as heavy rain, in the case of deviating from the automatic driving section, it is determined that the automatic driving cannot be continued.

In S102, CPU 11 determines whether or not vehicle-control is enabled. When it is determined that the vehicle control is enabled (affirmative determination), the process proceeds to S103, and when it is determined that the vehicle control is disabled (negative determination), the process returns to S101 and the process is repeated.

In S103, CPU 11 determines whether or not an application job is accepted from the body control application 45A of the terminal device 40, as illustrated in the above-described FIG. 3A. When it is determined that the application job has been accepted (affirmative determination), the process proceeds to S104, and when it is determined that the application job has not been accepted (negative determination), the process returns to S101 and the process is repeated.

In S104, CPU 11 executes the application accepted from the terminal device 40, and the process returns to S101 and repeats the process.

In S105, CPU 11 determines whether or not the occupant is using the terminal device 40. When it is determined that the terminal device 40 is in use (affirmative determination), the process proceeds to S106, and when it is determined that the terminal device 40 is not in use (negative determination), the process proceeds to S112. For example, when communication is performed via the body control application 45A of the terminal device 40, it may be determined that the communication is in use.

In S106, CPU 11 issues a notification to prompt the user to operate the terminal device 40. More specifically, as illustrated in the above-described FIG. 3B, the display unit 41 of the terminal device 40 may display a message for prompting the driver to operate.

In S107, CPU 11 determines whether the terminal device 40 has received an acceptance operation by pressing the "OK" button, as illustrated in the above-described in FIG. 3B. When it is determined that the acceptance operation has been accepted (affirmative determination), the process proceeds to S108, and when it is determined that the acceptance operation has not been accepted (negative determination), the process proceeds to S110.

In S108, the position of the steering wheel 31 and the seat 30 is changed to a driving-operable position, as illustrated in the above-described FIGS. 4A and 4B, by way of example, in CPU 11.

In S109, CPU 11 shifts the control system of the vehicle 100 from autonomous driving to manual driving, and terminates a series of processes by the vehicle control program 15A for the vehicle.

On the other hand, in S110, CPU 11 determines whether or not a predetermined period has elapsed since the notification in S106. When it is determined that the predetermined time has elapsed from the notification (in the case of affirmative determination), the process proceeds to S111, and when it is determined that the predetermined time has not elapsed from the notification (in the case of negative determination), the process returns to S107 and the process is repeated.

In S111, CPU 11 stops autonomous driving, stops the vehicle 100 at a safe location, and terminates a series of processes by the vehicle control program 15A.

On the other hand, in S112, CPU 11 issues a notification to prompt the driver to operate from the display unit 20 of the vehicle 100.

In S113, CPU 11 determines whether or not an acceptance operation is accepted by pressing the "OK" button from the display unit 20 of the vehicle 100. When it is determined that the acceptance operation has been accepted (affirmative determination), the process proceeds to S114, and when it is determined that the acceptance operation has not been accepted (negative determination), the process proceeds to S116.

In S114, CPU 11 changes the position of the steering wheel 31 and the seat 30 to the driving operable position as shown in FIGS. 4A and 4B described above, as an example.

In S115, CPU 11 shifts the control system of the vehicle 100 from autonomous driving to manual driving, and terminates a series of processes by the vehicle control program 15A for the vehicle.

On the other hand, in S116, CPU 11 determines whether or not a predetermined period has elapsed since the notification in S112. When it is determined that the predetermined time has elapsed from the notification (in the case of affirmative determination), the process proceeds to S117, and when it is determined that the predetermined time has not elapsed from the notification (in the case of negative determination), the process returns to S113 and the process is repeated.

In S117, CPU 11 stops autonomous driving, stops the vehicle 100 at a safe location, and terminates a series of processes by the vehicle control program 15A.

As described above, according to the present embodiment, when the shift from the automatic driving to the manual driving is required, the driving operation can be smoothly shifted even when the occupant uses the terminal device.

The vehicle control device according to the embodiment has been described above by way of example. The embodiment may be in the form of a program for causing a computer to execute the functions of the vehicle control device. Embodiments may be in the form of a computer-readable non-transitory storage medium having stored thereon the program.

In addition, the configuration of the vehicle control device described in the above embodiment is an example, and may be changed in accordance with a situation within a range not departing from the gist.

The flow of the processing of the program described in the above embodiment is also an example, and unnecessary steps may be deleted, new steps may be added, or the processing order may be changed without departing from the gist.

Further, in the above embodiment, a case has been described in which the processing according to the embodiment is realized by a software configuration using a computer by executing a program, but the present disclosure is not limited thereto. Embodiments may be realized by, for example, a hardware configuration or a combination of a hardware configuration and a software configuration.

What is claimed is:

1. A vehicle control device mounted in a vehicle, comprising:
a processor;
a storage unit storing a vehicle control program; and
an input/output interface for connection to external devices;
wherein the vehicle comprises:
a communication unit connected to the input/output interface and configured to communicate with a terminal device possessed by an occupant; and
a vehicle display unit connected to the input/output interface,
the processor, by executing the vehicle control program stored in the storage unit, operates as:
a body control unit connected to the communication unit and to the vehicle display unit; and
a vehicle control unit controlling autonomous driving of the vehicle, and,
in a state in which a driving operation by the occupant is required, the body control unit is configured to:
determine, based on information from the communication unit, whether the occupant is using the terminal device during automatic driving of the vehicle;
control a display unit of the terminal device to output a notification prompting the driving operation in response to a determination that the occupant is using the terminal device; and control the vehicle display unit to output a notification prompting the driving operation in response to a determination that the occupant is not using the terminal device.

2. The vehicle control device according to claim 1, wherein the terminal device includes a storage unit storing a body control application configured to operate in cooperation with the processor, and the processor determines that the occupant is using the terminal device in a case where communication with the vehicle is being performed via the body control application.

3. The vehicle control device according to claim 1, wherein the vehicle further comprises a position adjustment mechanism connected to a seat and a steering wheel of the vehicle, and the processor is configured to control the position adjustment mechanism to change a position of the seat and the steering wheel to a position in which the occupant is able to perform the driving operation in a case where the occupant accepts performing the driving operation.

4. The vehicle control device according to claim 1, wherein the terminal device is a smartphone of the occupant, a tablet terminal of the occupant, or an operation terminal mounted on the vehicle and detachable from the vehicle.

5. A vehicle control method comprising:
executing, by a processor of a vehicle control device mounted in a vehicle, the vehicle control device comprising an input/output interface and a vehicle control program stored in a storage unit, the processor operating as a vehicle control unit controlling autonomous driving of the vehicle and as a body control unit;
providing, in the vehicle, a communication unit connected to the input/output interface and the body control unit, and configured to communicate with a terminal device possessed by an occupant of the vehicle;
providing, in the vehicle, a vehicle display unit connected to the input/output interface and the body control unit; and,
in a state in which a driving operation by the occupant is required,
determining, by the body control unit based on information from the communication unit, whether the occupant is using the terminal device during automatic driving of the vehicle;
controlling, by the body control unit, a display unit of the terminal device to output a notification prompting the driving operation in response to a determination that the occupant is using the terminal device; and
controlling, by the body control unit, the vehicle display unit to output a notification prompting the driving operation in response to a determination that the occupant is not using the terminal device.

6. The vehicle control method according to claim 5, wherein the terminal device includes a storage unit storing a body control application configured to operate in cooperation with the processor, and
determining that the occupant is using the terminal device includes determining that communication with the vehicle is being performed via the body control application of the terminal device.

7. The vehicle control method according to claim 5, further comprising providing, in the vehicle, a position adjustment mechanism connected to a seat and a steering wheel of the vehicle, and controlling the position adjustment mechanism to change a position of the seat and the steering wheel to a position in which the occupant is able to perform the driving operation in a case where the occupant accepts performing the driving operation.

8. The vehicle control method according to claim 5, wherein the terminal device is a smartphone of the occupant, a tablet terminal of the occupant, or an operation terminal mounted on the vehicle and detachable from the vehicle.

9. A non-transitory storage medium storing a vehicle control program that, in a case executed by a processor of a vehicle control device comprising an input/output interface for connection to external devices, causes the processor to:

operate as a body control unit connected to a communication unit and to a vehicle display unit; and operate as a vehicle control unit controlling autonomous driving of the vehicle, wherein the vehicle comprises the communication unit connected to the input/output interface and configured to communicate with a terminal device possessed by an occupant, and the vehicle display unit connected to the input/output interface, and, in a state in which a driving operation by the occupant is required, the processor is further caused to determine, based on information from the communication unit, whether the occupant is using the terminal device during automatic driving of the vehicle, control a display unit of the terminal device to output a notification prompting the driving operation in response to a determination that the occupant is using the terminal device, and control the vehicle display unit to output a notification prompting the driving operation in response to a determination that the occupant is not using the terminal device.

10. The non-transitory storage medium according to claim 9, wherein the terminal device includes a storage unit storing a body control application configured to operate in cooperation with the processor, and the processor determines that the occupant is using the terminal device in a case where communication with the vehicle is being performed via the body control application.

11. The non-transitory storage medium according to claim 9, wherein the vehicle further comprises a position adjustment mechanism connected to a seat and a steering wheel of the vehicle, and the processor is configured to control the position adjustment mechanism to change a position of the seat and the steering wheel to a position in which the occupant is able to perform the driving operation in a case where the occupant accepts performing the driving operation.

12. Non-transitory storage medium according to claim 9, wherein the terminal device is a smartphone of the occupant, a tablet terminal of the occupant, or an operation terminal mounted on the vehicle and detachable from the vehicle.

* * * * *